United States Patent

[11] 3,556,475

| [72] | Inventor | Charles C. Olenik<br>Los Angeles County, Calif. |
|---|---|---|
| [21] | Appl. No. | 731,239 |
| [22] | Filed | May 22, 1968 |
| [45] | Patented | Jan. 19, 1971 |
| [73] | Assignee | Borg-Warner Corporation<br>Chicago, Ill.<br>a corporation of Delaware |

[54] SHUTOFF VALVE
5 Claims, 6 Drawing Figs.

[52] U.S. Cl............................................. 251/306,
277/143
[51] Int. Cl............................................. F16k 1/22,
F16j 9/06
[50] Field of Search.................................. 251/170,
173, 174, 175, 298, 305, 306, 307, 308; 277/138,
142, 143, 194

[56] References Cited
UNITED STATES PATENTS
2,600,310  6/1952  Marien.................... 277/143X

| 2,974,921 | 3/1961 | Kaswan................. | 251/306X |
| 3,059,897 | 10/1962 | Jensen.................. | 251/306 |
| 3,260,502 | 7/1966 | Plumer.................. | 251/306 |

FOREIGN PATENTS

| 873,408 | 7/1961 | Great Britain........... | 251/306 |
| 901,750 | 7/1962 | Great Britain........... | 277/143 |

*Primary Examiner*—Henry T. Klinksiek
*Attorneys*—Donald W. Banner, Lyle S. Motley, C. G. Stallings and William S. McCurry

ABSTRACT: A shutoff valve for a fluid flow conduit which includes a pivotally supported valve closure element. The closure element includes a peripheral groove within which is disposed a sealing ring including a primary sealing surface adapted to engage the conduit bore. The ring is sized to allow radial movement with respect to the closure element and includes a secondary sealing surface biased into sealing engagement with a complementary secondary sealing surface disposed within the peripheral groove of the closure element.

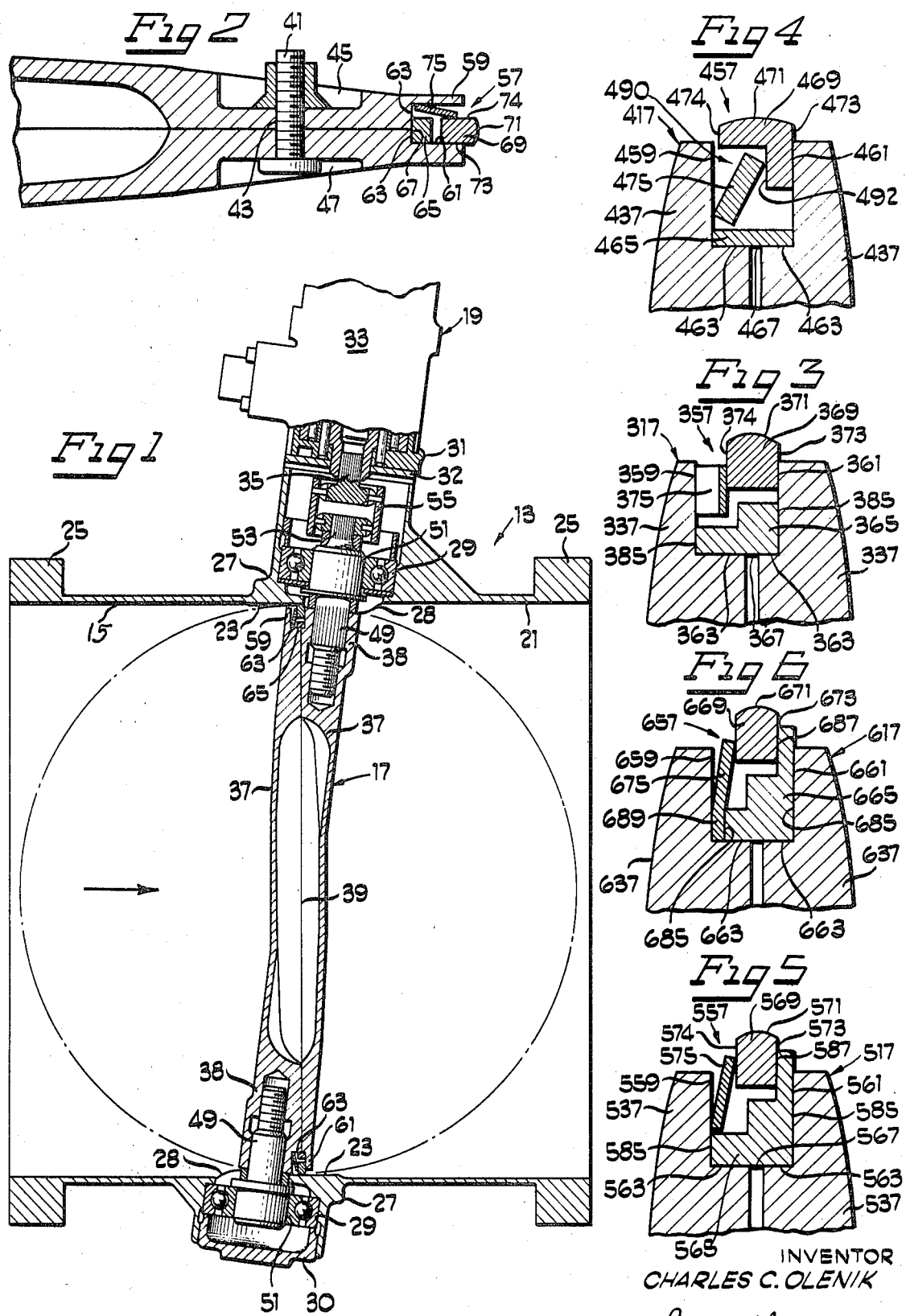

3,556,475

SHUTOFF VALVE

BACKGROUND OF THE INVENTION

This invention relates to a shutoff valve for a gaseous-fluid flow conduit. More particularly it relates to a shutoff valve of the butterfly type including a sealing arrangement providing minimal internal leakage.

One important design criterion to be considered in the construction of shutoff valves for gaseous-fluid flow passages is the ability of the valve to completely seal off flow when in the closed position. The sealing arrangement must be suitable for application in both high and low fluid temperature applications and it must include a seal having sufficient flexibility to insure efficient closure against relatively high pressure differentials. In addition, the seal must accommodate machining inaccuracies and must possess the ability to compensate for irregularities in the seating surface which might be occasioned by manufacturing tolerances or component distortion.

Shutoff valves of the butterfly type have commonly been used in applications where control of the flow of a gaseous fluid through a conduit is required. Normally these valves include a pivotal valve closure element supported upon pinions for rotation between open and closed positions. The outer periphery of the valve-closure element usually includes a groove containing a seal ring which is urged into intimate contact with the passage bore to close the flow passage. The sealing ring, to be effective, must be constructed in a manner such that some relative radial movement with respect to the valve element is provided. In this way, conformity with irregularities in the bore seat is assured.

It must be appreciated however, that such a construction, while providing an efficient seal against the bore seat provides a secondary path of leakage through the seal-ring groove between the sealing ring and the valve-closure element. Heretofore, no totally effective means have been provided to insure effective sealing of this secondary leakage path.

In certain valve constructions, attempts have been made to minimize leakage through the seal-ring groove. A seal arrangement has been provided which includes a radially movable sealing ring centrally supported between a pair of radially directed ring guides within a groove that is wider than the axial width of the sealing ring. So long as this sealing ring is supported within the ring guide, the ability of the seal to prevent secondary leakage is adequate. However, axial movement of the sealing ring occasioned by closure of the valve and fluid pressure acting axially upon the sealing ring causes permanent deformation of the ring guide located downstream of the seal ring. When this occurs intimate contact between the sealing ring and support ring is lost and excessive secondary leakage occurs.

Accordingly, it is the principal object of the present invention to provide an improved form of butterfly-type shutoff valve having an efficient sealing arrangement which insures minimal internal leakage.

SUMMARY OF THE INVENTION

Very generally, the invention is directed to a butterfly valve for a gaseous-fluid flow conduit having an effective sealing arrangement.

The valve-closure element includes an annular groove formed about its outer periphery which includes means defining a secondary sealing surface internally of the groove.

A sealing ring having an appropriately formed primary sealing surface is disposed within the annular channel. This sealing ring includes a primary sealing surface for engagement with the valve bore and is sized to allow radial deformation to accommodate irregularities in the bore shape.

This sealing ring additionally includes a complementary secondary sealing surface disposed in sealing engagement with the radially directed secondary sealing surface in the groove. Biasing means are provided within the groove to axially urge the secondary sealing surfaces into intimate contact to insure positive sealing of the secondary leakage path.

DESCRIPTION OF THE DRAWINGS

FIG. 1 is a sectional elevational view of a butterfly valve illustrating various features of the invention.

FIG. 2 is a fragmentary sectional view on an enlarged scale of the embodiment of FIG. 1.

FIGS. 3 through 6 are fragmentary sectional views on an enlarged scale showing various modified forms of the invention.

DETAIL DESCRIPTION

Referring now to the drawings, FIGS. 1 and 2 are illustrative of a shutoff valve of the butterfly type embodying the features of the present invention.

The butterfly valve, generally designated 13, includes a conduit portion 15 defining a gaseous-fluid flow path, a valve-closure element 17, and an actuator mechanism 19.

The conduit portion 15 includes a generally cylindrical bore 21 having a seating surface 23 positioned in surrounding relation to the valve-closure element 17. The seating surface is parallel to the conduit bore and is merely a continuation of the bore surface.

The conduit portion 15 further includes appropriately formed mounting flanges 25 for connection of the butterfly valve to a fluid conduit system.

A pair of bearing bosses 27 are secured to the exterior of the conduit 15 in a position generally aligned with the seating surfaces 23. Each boss is disposed in surrounding relation to an aperture 28 formed in the conduit wall. The bosses 27 support a pair of coaxially aligned bearings 29 which pivotally support the closure element within the conduit 15.

The bearings 29 are positioned upon a centerline which is slightly oblique to a plane normal to the centerline of the cylindrical bore 21.

One bearing boss includes a seal cap 30 to prevent fluid leakage from the boss. The other of the bearing supporting bosses 27 includes an actuator mechanism support housing 31 to which is secured the actuator mechanism 19. A seal 32 is interposed between the actuator support housing and the actuator mechanism to prevent fluid leakage.

The actuator mechanism 19 includes a torque motor 33 connected to a power source (not shown). The torque motor includes an operating shaft 35 connected to the valve-closure element 17 which is rotatable in response to power input to open and close the shutoff valve.

The valve-closure element 17 is formed of a pair of complementary element sections 37. Each section is generally circular in shape and includes a pivot support 38 and a generally planar mating face 39. The mating faces 39 are retained in surface-to-surface contact with each other to form the closure element by a plurality of fasteners 41, best seen in FIG. 2. The fasteners 41 extend through appropriately formed apertures 43 in the element sections. The element sections include recesses 45 and 47 associated with each of the apertures 43 to receive the fastener elements. This construction provides for minimum resistance to flow across the exposed faces of the valve closure element 17 when in the open position.

Each element section 37 includes a generally radially extending support pin 49 fixed to the pivot support 38. The pins are disposed upon a common axis slightly oblique to a plane extending normal to the centerline of the bore 21. The support pins include bearing surfaces 51 which rotatably support the closure element 17 upon the bearings 29. The closure element sections are formed in a manner such that when the element is rotated about the oblique centerline of the support pins to the closed position the closure element 17 is disposed generally normal to the centerline of the bore 21 in general axial alignment with the seating surface 23.

One of the support pins 49 includes an outwardly extending actuator shaft 53. This shaft is connected to the operating shaft 35 of the torque motor by a coupling 55. Rotation of the torque motor shaft is thus transferred to the valve closure element 17 through the coupling 55 and actuator shaft 53 to position the valve-closure element.

In accordance with the present invention the valve-closure element 17 includes a sealing arrangement associated with its outer periphery which provides a tight seal between the closure element and the conduit bore when in the closed position. This seal not only provides efficient primary sealing against the conduit bore but also insures minimal secondary leakage.

Each of the element sections 37 includes a relief formed about its outer periphery which combine to form a generally annular groove 57 circumscribing the valve closure element 17. The groove 57 is defined by a pair of spaced apart generally radially directed annular surfaces 59 and 61. When the valve is in the closed position the surface 61 is disposed downstream of the surface 59 (as shown in FIG. 1). The surfaces 59 and 61 are connected by an axially extending surface 63, a portion of which is formed by each of the element sections 37.

A generally annular shear ring 65 is disposed within the groove 57 having a generally axially extending cylindrical surface 67 in intimate contact with the axial surface 63 of the element sections 37. The axial width of the shear ring 65 is, in the embodiment of FIGS. 1 and 2, somewhat less than the width of the groove 57. It is only necessary that the ring bridge the mating surfaces 39.

The presence of the shear ring 65 within the groove 57 prevents sliding movement of the element sections with respect to each other along the mating surfaces 39 which may be occasioned by distortion of the valve-closure element when subjected to forces of the fluid pressure. Shear loads are transferred to the ring 65 thus minimizing the loads which must be accommodated by the fastening arrangement.

A continuous, generally annular, sealing ring 69 is disposed in the groove 57 radially outwardly of the shear ring 65. It is made of metal or other suitable material.

The sealing ring 69 has an internal diameter which is larger than the maximum diameter of the shear ring allowing free floating movement of the ring within the groove. The outer diameter of the sealing ring 69 is slightly larger than the diameter of the cylindrical seating surface of the bore 21 and defines a curved sealing surface 71. Because of the relative diameter of the sealing surface 71 and seating surface 23 of the cylindrical bore, intimate contact between these surfaces is assured and irregularities in the seating surface are readily accommodated. The diameter of the sealing surface 71 is of a size such that surface-to-surface contact with the seating surface 23 is accomplished when the valve-closure element 17 is positioned approximately 4° oblique to a plane normal to the centerline of the bore 21.

To insure sealing against secondary leakage through the groove 57 a generally radially directed secondary sealing surface 73 is provided on the sealing ring 69 which is adapted to be placed in sealing engagement with the radial surface 61 of the peripheral groove. The surface 61 therefore forms a secondary sealing surface associated with the groove 57.

The sealing relationship between the surface 73 of the ring 69 and the surface 61 of the groove 57 provides an efficient barrier to possible secondary leakage through the groove. The sealing ring 69 also includes a second radially directed surface 74 spaced from the secondary sealing surface 73. The axial width between these surfaces is such that when the surface 73 is in sealing engagement with the surface 61 of the groove 57 the surface 74 is spaced axially from the surface 59.

The depth of the relieved portions formed in the mating element sections 37 is unequal. Thus when surface 73 and surface 61 are disposed in sealing engagement, the curved sealing surface 71 is disposed with the center of curvature generally aligned with the center plane of the valve-closure element.

Biasing means 75 are disposed within the groove 57 which urge the surfaces 61 and 73 into sealing engagement. The biasing means illustrated is a spring washer such as a belleville washer disposed between the surface 59 of the groove and the surface 74 of the sealing ring. Any suitable biasing means however, may be used. The use of a biasing means such as the spring 75 in conjunction with a sealing ring which has an axial width which is less than the width of the groove 57 provides an important advantage. The axial load upon the radial sealing surfaces 61 and 73 and the contacting surface of the spring 75 and sealing ring 69 can be controlled by spring selection. Therefore, wear occasioned by radial movement of the sealing ring is minimized.

In the illustrated embodiment, the biasing spring 75 and sealing ring 69 are positioned such that the ring is urged in a direction toward the downstream side of the peripheral groove. Therefore, fluid pressure upon the sealing ring 69 when in the closed position serves to increase the force urging the secondary sealing surfaces 61 and 73 into sealing engagement.

In operation, the butterfly valve 13 is connected to a fluid conduit system by means of flanges 25. Fluid flow is in the direction of the arrow seen in FIG. 1. The cylindrical bore 21 including the seating surface 23 presents a continuous coaxial flow path axially aligned with the adjacent elements of the conduit system.

Electrical input to the torque motor 33 causes rotation of the operating shaft 35 which in turn is effective to rotate the valve-closure element 17 through the coupling 55.

When urged into its closed position, the valve closure element is disposed at an angle of approximately 4° with respect to a plane perpendicular of the centerline of the bore 21. In this position the sealing ring 69 is urged into intimate contact with the seating surface 23 along the sealing surface 71. This contact provides an efficient primary sealing effective to terminate flow through the conduit bore.

The sealing ring 69 is further urged into sealing engagement with the radially directed sealing surface 61 of the groove 59 along the radial sealing surface 73 of the ring by the biasing means 75. The sealing contact between the ring 69 and the secondary sealing surface 61 associated with the peripheral groove 59 is at the downstream side of the sealing ring. Therefore, fluid pressure, acting upon the sealing ring, serves to increase the seal loading against the secondary sealing surface.

Turning now to the embodiments of FIGS. 3 through 6, there are illustrated certain modified forms of the invention.

In the embodiment of FIG. 3 there is illustrated a valve-closure element 317 forming part of a butterfly-type shutoff valve. The valve-closure element 317 is adapted to be disposed within a flow conduit such as the flow conduit 15 of the embodiment of FIGS. 1 and 2. The valve-closure element 317, however, includes certain modifications in the sealing arrangement.

The closure element 317 is formed of a pair of element sections 337 including relieved portions about their outer periphery to define a seal groove 357. The groove includes a pair of spaced apart generally radially directed surfaces 359 and 361 and an axially extending cylindrical surface 363, partially defined by each of the element sections.

A shear ring 365 is disposed within the groove 357 which includes an axially extending cylindrical surface 367 disposed in intimate contact with the surface 363. This relationship serves to accommodate shear loads to which the valve-closure element 317 is subjected as in the previously described embodiment.

The shear ring 365 includes generally radially directed end surfaces 385 which are disposed in surface-to-surface contact with the surfaces 359 and 361 of the closure element groove. The element sections of this embodiment, unlike those of the embodiment of FIGS. 1 and 2 do not mate along planar mating surfaces such as the surfaces 39 of FIG. 1. In this embodiment, the element sections are clamped together by fasteners (not shown) which retain them in contact with the shear ring end surfaces 385. Thus, the distance between the surfaces 359 and 361 of the seal groove 357 is determined by the axial width of the shear ring 365.

Machining of the relieved portions of the closure element sections which define the groove 357 is, therefore, substantially simplified, and the critical machining necessary to ensure proper groove width is readily accomplished during machining of the shear ring 365. As can be appreciated, the shear ring width can be easily controlled by simple manufacturing processes such as, for example, grinding or the like.

A sealing ring 369 is disposed within the groove 357 which includes a curved primary sealing surface 371 for engagement with the seating surface of a conduit bore. The sealing ring is appropriately sized to allow radial deformation to accommodate seating surface irregularities.

The sealing ring 369 further includes a generally radially directed secondary sealing surface 373 which is disposed in sealing engagement with the downstream radial surface 361 of the groove 357 to prevent secondary leakage. The width of the sealing ring 369, as in the previous embodiment, is less than the axial width of the groove 357 and the ring includes a second radially extending surface 374 which is spaced from the groove surface 359 when the ring surface 373 and the groove surface 361 are in sealing engagement.

Biasing means 375 are disposed in the groove 357 between the surfaces 359 and 361 which urges the sealing ring radial sealing surface into sealing engagement with the surface 361 of the groove. In this embodiment, the biasing means is an annular convolute wafer spring. A spring washer, such as that illustrated in the embodiment of FIGS. 1 and 2 would however, be equally suitable.

Referring to FIG. 4, there is illustrated a slightly modified form of butterfly valve incorporating the principles of the present invention.

In this embodiment, a valve closure element 417 is provided which is adapted to be supported within a conduit bore to shut off fluid flow as in the case of the embodiment of FIGS. 1 and 2.

The valve-closure element 417 includes a pair of element sections 437 including relieved portions formed about their outer periphery defining a groove 457. The peripheral groove includes a pair of spaced apart radially directed surfaces 459 and 461 and an axially extending surface 463, a portion of which is defined by each of the element sections.

A shear ring 465 similar to the ring 365 of FIG. 3 is disposed within the groove 457 and includes an axially extending surface 467 in intimate contact with the axial surface 463 of the peripheral groove as in the embodiments previously described. The contact between these axial surfaces prevents distortion of the valve-closure element 417 when subjected to fluid pressures.

A sealing ring 469 is disposed within the groove 457. The sealing ring includes a curved sealing surface 471 adapted to be placed in sealing engagement with the seating surface of a conduit bore to provide primary sealing between the bore and the closure element. As in the previous embodiments the ring 469 is sized to allow radial movement within the groove 457 to accommodate irregularities in the seating surfaces.

The sealing ring 469 further includes a radially directed sealing surface 473 which is urged into sealing engagement with the surface 461 of the groove 457 to prevent secondary leakage. The ring also includes a relieved portion 490 defining a radial surface 492.

A biasing means 475 in the form of a spring washer is disposed within the groove 457 between the surface 459 of the groove and the surface 492 of the sealing ring to urge the sealing ring and shear ring surfaces into sealing engagement. This arrangement provides for a groove of minimum axial width and provides effective sealing of both primary and secondary leakage.

Referring now to FIG. 5, there is illustrated a slightly modified form of butterfly valve incorporating the principles of the present invention.

In this embodiment, a valve-closure element 517 is provided which is adapted to be supported within a conduit bore to shut off fluid flow as in the case of the embodiment of FIGS. 1 and 2.

The valve-closure element 517 includes a pair of element 537 including relieved portions formed about their outer periphery defining a groove 557. The peripheral groove includes a pair of spaced apart radially directed surfaces 559 and 561 and an axially extending surface 563, a portion of which is defined by each of the element sections.

A shear ring 565 is disposed within the groove 557 and includes an axially extending surface 567 in intimate contact with the axial surface 563 of the peripheral groove as in the embodiments previously described. The contact between these axial surfaces prevents distortion of the valve-closure element 517 when subjected to fluid pressures.

The shear ring 565 further includes generally radially directed end surfaces 585 disposed in surface-to-surface contact with the radial surfaces 559 and 561 of the groove 557. As in the embodiment of FIG. 3 the element sections 537 are secured together by fasteners (not shown) with the shear ring 565 clamped between the surfaces 559 and 561. The width of the shear ring therefore, controls the width of the groove 557. Careful machining of the mating surfaces of the element sections is therefore not necessary.

The shear ring 565 further includes a generally radially directed secondary sealing surface 587. Since this surface is integral with the shear ring its relationship with the end surface 585 can be readily established. As a result, the dimensional control is accomplished by machining of this single element.

A sealing ring 569 is disposed within the groove 557. The sealing ring includes a curved sealing surface 571 adapted to be placed in sealing engagement with the seating surface of a conduit bore to provide primary sealing between the bore and the closure element. As in the previous embodiments the ring 569 is sized to allow radial movement within the groove 557 to accommodate irregularities in the seating surfaces.

The sealing ring 569 further includes a radially directed sealing surface 573 which is urged into sealing engagement with the surface 587 of the shear ring 565 to prevent secondary leakage. A biasing means 575 is in the form of a spring washer disposed within the groove 557 between the surface 559 of the groove and the surface 574 of the sealing ring to urge the sealing ring and shear ring surfaces into sealing engagement.

The relative axial widths of the shear ring 565 and the sealing ring 569 and the distance between the secondary sealing surface 587 and the shear ring end surfaces 585 control the axial load provided by the biasing means 575. In the embodiment of FIG. 5 therefore, critical machining may be accomplished upon a single element, namely, the shear ring 565. The width of the groove 557 is defined by the axial width of the shear ring 565 and the secondary sealing surface 587 is formed directly on the shear ring. The distance between the secondary sealing surface 587 and the end surface determines the amount of compression of the biasing means and consequently the biasing force.

Turning now to FIG. 6 there is illustrated a slightly modified form of the invention. In this embodiment a butterfly-type valve-closure element 617 including a pair of element sections 637 is provided which includes a peripheral groove 657. This groove is defined by radially extending surfaces 659 and 661 and by an axially extending surface 663 partially formed on each element section 637.

A shear ring 665 including end faces 685 is disposed in the groove and in intimate contact with the axially extending surfaces 663. This shear ring includes a radially directed secondary sealing surface 687 as in the embodiment of FIG. 5.

A sealing ring 669 is disposed in the groove 657 which includes a primary sealing surface 671 adapted for sealing engagement with a flow conduit. The ring 669 also includes a radial sealing surface 673 disposed in sealing engagement with the sealing surface 687 of the shear ring. As in the previous embodiments the seal ring is sized to allow radial deformation to ensure an efficient primary seal.

Biasing means 675 are disposed in the groove 657 which urge the sealing surfaces into sealing engagement. The biasing means of this embodiment is a spring washer such as a belleville spring. However, to prevent movement of the spring within the groove, the spring includes a clamped flange 689 interposed between one of the end faces 685 and one surface 659 of the groove. The spring is clamped into position when the element sections 637 are assembled to prevent undesirable movement during operation. As can be appreciated, the axial width of the spring flange 689 and shear ring 665 determine the groove width.

A butterfly-type shutoff valve has been provided which insures efficient sealing of primary and secondary leakage paths and minimizes internal leakage.

I claim:

1. A butterfly-type shutoff valve comprising; a fluid flow conduit, a valve-closure element pivotally supported in said conduit and movable between open and closed positions, said closure element having a groove formed about the outer periphery thereof, said groove defining a radially disposed generally annular secondary sealing surface, an annular sealing ring disposed in said groove including a primary sealing surface for engagement with said conduit, and a generally annular secondary sealing surface, biasing means disposed in said groove in engagement with said annular sealing ring effective to keep the secondary sealing surface of said sealing ring in engagement with the secondary sealing surface of said groove and effective to allow for radially inward and radially outward movement of said sealing ring with respect to said groove.

2. A butterfly-type shutoff valve as claimed in claim 1 wherein said sealing ring has an outside diameter greater than the inside diameter of said conduit to allow radial deformation thereof within said groove when said closure element is moved to said closed position to accommodate irregularities in said conduit.

3. A butterfly-type shutoff valve as claimed in claim 2 wherein said groove is defined by means including a pair of spaced apart annular, generally radial surfaces, one of said surfaces further defining said secondary sealing surface associated with said groove, said secondary sealing surface of said sealing ring being generally radially directed complementary to said secondary sealing surface associated with said groove.

4. A butterfly-type shutoff valve as claimed in claim 1 wherein said valve-closure element includes a pair of complementary element sections fastened together to form said element, said peripheral groove being partially formed in each said element section by means including a generally axially extending cylindrical surface, and an annular shear ring disposed within said groove including a generally cylindrical surface disposed in intimate contact with at least a portion of said axially extending cylindrical surface formed by each said element section.

5. A butterfly-type shutoff valve as claimed in claim 4 wherein said shear ring includes a generally radially directed annular surface defining said secondary sealing surface associated with said groove.